United States Patent
Okura (10) Patent No.: US 6,623,124 B2
(45) Date of Patent: Sep. 23, 2003

(54) PROJECTION TYPE ILLUMINATING DEVICE

(75) Inventor: Mitsuyoshi Okura, Tokyo (JP)

(73) Assignee: Hal Corporation, Tokyo (JP)

( * ) Notice: Subject to any disclaimer, the term of this patent is extended or adjusted under 35 U.S.C. 154(b) by 0 days.

(21) Appl. No.: 09/788,820

(22) Filed: Feb. 20, 2001

(65) Prior Publication Data

US 2001/0043313 A1 Nov. 22, 2001

(30) Foreign Application Priority Data

May 16, 2000 (JP) ........................ 2000-142776
Sep. 21, 2000 (JP) ........................ 2000-006829

(51) Int. Cl.[7] .................... G03B 29/00; G03B 21/14
(52) U.S. Cl. .................. 353/43; 353/97; 353/101
(58) Field of Search ................ 353/43, 42, 97, 353/101; 352/139, 140; 396/72

(56) References Cited

U.S. PATENT DOCUMENTS

| | | | | |
|---|---|---|---|---|
| 1,640,694 A | * | 8/1927 | Deming | 352/139 |
| 2,090,086 A | * | 8/1937 | Weiner | 116/310 |
| 2,478,336 A | * | 8/1949 | Stein et al. | 353/43 |
| 2,764,058 A | * | 9/1956 | Ellis | 353/43 |
| 3,078,761 A | * | 2/1963 | Zorn | 353/42 |
| 3,183,773 A | * | 5/1965 | Weinstein | 353/42 |
| 4,396,262 A | * | 8/1983 | Laizans et al. | 353/43 |
| 5,233,375 A | * | 8/1993 | Williams et al. | 353/43 |

FOREIGN PATENT DOCUMENTS

| | | |
|---|---|---|
| JP | 02192601 A | 7/1990 |
| JP | 3029927 | 7/1996 |

* cited by examiner

Primary Examiner—Russell Adams
Assistant Examiner—D. Ben Esplin
(74) Attorney, Agent, or Firm—Merchant & Gould P.C.

(57) ABSTRACT

To provide a projection type illuminating device which can clearly form a silhouette, a projected figure or the like at a projecting position by a lighted electric lamp, and is safely used without damaging an eye even when the light accidentally enters the eye of a person. The device includes a condenser lens barrel part 20 removably attached to the tip of an illuminator main body 10 for performing radiation with a lighted electric lamp 13, a mask part 30 removably attached to the tip of the condenser lens barrel part 20 and having a shading plate 31 in which projecting opening parts 32 of various forms are opened and formed in the center, at the tip, and a focus adjusting lens barrel part 40 that is back and forth slidably attached to the tip of the condenser lens barrel part 20 in the state of covering the total of the mounted mask part 30 and that projects the opening part shape of the projecting opening part 32 by focusing the light passing through the projecting opening part 32 of the mask part 30 by the radiation of the illuminator main body 10 together with the condenser lens barrel part 20. The focus adjusting lens barrel part 40 is configured to have a screw type structure or a click type structure.

8 Claims, 7 Drawing Sheets

PROJECTION TYPE ILLUMINATING DEVICE

BACKGROUND OF THE INVENTION

1. Field of the Invention

This invention relates to a portable projection type illuminating device that is utilized as an illuminating apparatus such as a flashlight, or an advertising illumination, or a projecting apparatus such as a projecting toy, and can project and form a silhouette, a character, a pattern or the like of a clear given shape on a projecting position.

2. Description of the Prior Art

Previously, for this type of projection type illuminating device, for example, there has been a device having a filter in which a light transmitting opening part with a shape of an arrow or the like is opened and formed, arranged at the front part of the light beam emitting hole of a laser device, so that the light beam of the laser device may be radiated from the rear of this filter to display the arrow at a given projecting position in the front.

BRIEF SUMMARY OF THE INVENTION

Object of the Invention

However, in such a previously projection type illuminating device, in the case where the arrow projected by a light beam with a strong directivity of the laser device carelessly enters an eye of a person, there is a probability of damaging the eye since the optical intensity emitted in a state of being converged by the laser device is very high. Furthermore, the light source of the laser device has a monochromatic wavelength, and therefore, around the projected arrow, an unnecessary diffraction phenomenon may be caused, or interference fringes may be generated, and there has been such a problem that the shape of the arrow cannot clearly be projected.

Furthermore, aside from this, by Japanese Patent Laid-Open No. 2-192601, a flashlight with a liquid crystal watch is proposed, and this flashlight is a device that projects, for example, the display of time by using liquid crystal display, by providing an optical lens for projecting the liquid crystal display arranged in front of the lamp containing a light source at the front of the light source. However, in the case of such a device with a liquid crystal display structure, it is necessary to arrange a liquid crystal display body in the projecting light, and therefore, not only the structure becomes complex but also the cost becomes extremely high, and such a complex and expensive device is not suitable for being used in, for example, a flashlight type portable projecting device used as a toy.

Therefore, this invention is made in view of the above described previously existing various situations, and it is an object to provide a portable projection type illuminating device which can safely be used without damaging an eye even when the light carelessly enters the eye of a person, and further, which can easily realize and form a silhouette, a pattern or the like with a clear given shape on the projecting position by lighting a light source such as an electric lamp, and furthermore, which can widely be used as a projecting apparatus such as a projecting toy besides an illuminating apparatus such as a flashlight or an advertising illumination, and additionally, which has a simple structure and can be provided at a low cost.

SUMMARY OF THE INVENTION

In order to solve the above described problems, this invention is a projection type illuminating device 1, which comprises an illuminator main body 10 for performing radiation by a light source 13, and a mask part 30 removably attached to the tip of the illuminator main body 10 and having a shading plate 31 in which projecting opening parts 32 of various forms are opened and formed, at the end part, in which the opening part shape of the projecting opening part 32 is projected as it is illuminated from the back with the light radiated by the illuminator main body 10 and passing through the projecting opening part 32 of the mask part 30, Furthermore, it is a projection type illuminating device 1, which comprises an illuminator main body 10 for performing radiation by a light source 13, and a mask part 35 removably attached to the tip of the illuminator main body 10 and having a shading plate 36 in which translucent projecting plate 37 having various figures such as a symbol or a pattern displayed thereon are arranged, at the end part, in which the various figures on the projecting plate 37 are projected as they are illuminated from the back with the light radiated by the illuminator main body 10 and passing through the projecting plate 37 of the mask part 35.

Still furthermore, it is a device comprising the above described illuminator main body 10, and mask parts 30, 35, and further comprising a focus adjusting lens barrel part 40, in which this focus adjusting lens barrel part 40 is movably attached to the above described mask parts 30, 35 in a state of covering the mask parts 30, 35, and the opening part shape of the projecting opening part 32 is projected as it is by focusing the light radiated by the illuminator main body 10 and passing through the projecting opening part 32 of the mask part 30 by using the focus adjusting lens barrel part 40, or the various figures on the projecting plate 37 are projected as they are by focusing the light passing through the projecting plate 37 by using the focus adjusting lens barrel part 40.

In addition, the focus adjusting lens barrel part 40 has a screw type structure so that it may move back and forth by being screw-rotated to the mask parts 30, 35, or has a click type structure so that it may move back and forth while being sequentially stopped to the mask parts 30, 35.

Furthermore, a condenser lens barrel part 20 is removably attached to the tip of the illuminator main body 10, and it can be configured that the light radiated by the illuminator main body 10 and passing through the shading plates 31, 36 of the mask parts 30, 35 is focused by the condenser lens barrel part 20 and the focus adjusting lens barrel part 40.

In the projection type illuminating device 1 according to this invention with the above described structure, the light radiated by the illuminator main body 10 performing radiation with the light source 13 and passing through the projecting opening part 32 of the mask part 30 clearly projects the light flux of the opening part shape of the projecting opening part 32, and similarly, the light passing through the projecting plate 37 of the mask part 35 projects the various figures displayed on the projecting plate 37 as they are, and it clearly forms silhouettes, patterns, and others on arbitrary projecting positions.

The focus adjusting lens barrel part 40 movably attached to the mask parts 30, 35 images the opening part shape of the projecting opening part 32 to be projected, the displayed figure or the like at an arbitrary projecting position by a back-illumination due to the light radiated by the illuminator main body 10 and passing through the projecting opening part 32 and the projecting plate 37 of each of the shading plates 31, 36 of the mask parts 30, 35.

The focus adjusting lens barrel part 40 with a screw type structure moves the focus adjusting lens barrel part 40 back and forth, for example, with a given screw pitch by being screw-rotated to the condenser lens barrel part 20. Furthermore, the focus adjusting lens barrel part 40 with a click type structure moves the focus adjusting lens barrel part 40 back and forth while being sequentially stopped to the condenser lens barrel part 20.

DETAILED DESCRIPTION OF THE PREFERRED EMBODIMENTS

One embodiment of this invention will be described below by referring to drawings. The reference numeral 1 shown in the figure denotes a portable projection type illuminating device that is used, for example, as an illuminating apparatus such as a flashlight or an advertising illumination, or a projecting apparatus such as a projecting toy, and uses a battery such as a dry battery.

Figure 1:
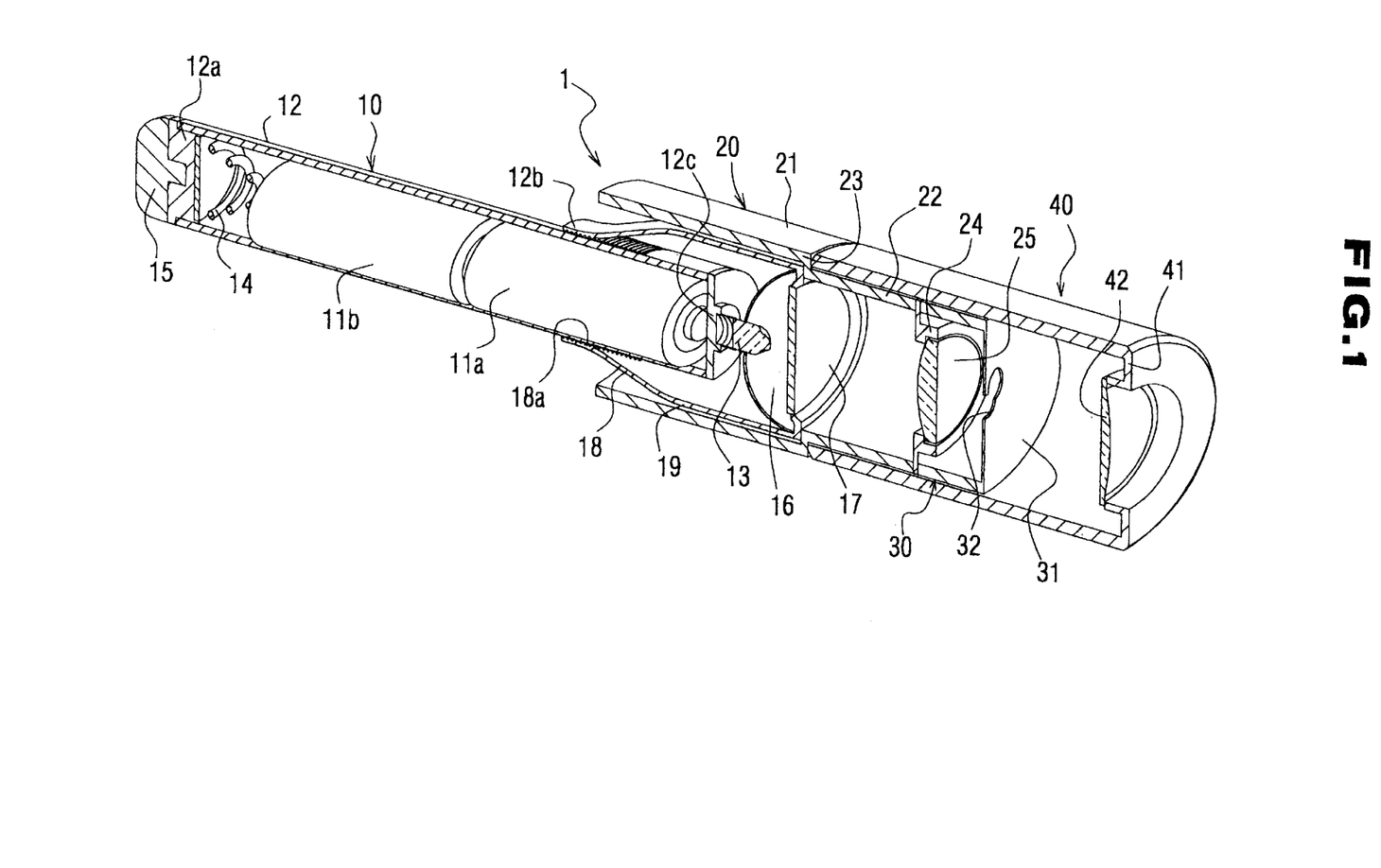
FIG. 1 is a partially cut schematic perspective view according to one embodiment of the present invention.

As shown in FIG. 1, this projection type illuminating device 1 comprises an illuminator main body 10 used for illuminating the front, for example, by the light of an electric lamp 13 as a light source lighted by using contained power sources 11a, 11b and formed, for example, like a cylinder, a condenser lens barrel part 20 removably attached to the tip of the illuminator main body 10 and made by attaching a convex lens 25 on the end part opening side of the barrel, a mask part 30 removably attached to the tip of the condenser lens barrel part 20 and having a shading plate 31 in which projecting opening parts 32 of various forms are opened and formed in the center, on the end part opening side of the barrel, and a focus adjusting lens barrel part 40 which is attached back and forth slidably to the tip of the condenser lens barrel part 20 to cover the total of the mask part 30 and which is made by arranging a convex lens 42 on the end part opening side of the barrel so that the opening part shape of the projecting opening part 32 may be projected as it is illuminated from the back by focusing the light radiated by the illuminator main body 10 and passing through the projecting opening part 32 of the mask part 30 together with the condenser lens barrel part 20.

In the illuminator main body 10, for example, two batteries 11a, 11b are contained in series in the back and forth direction of a cylindrical handle part 12, and the positive electrode of the front battery 11a is brought into contact with either of a pair of hip side contact terminals for the electric lamp 13 removably attached to a bayonet socket part 12c provided at the tip part of the handle part 12, and the negative electrode of the rear battery 11b is brought into contact in the state where both of the above described batteries 11a, 11b are pressed to the forward side by a spring type contact 14 attached to the inside of a lid part 12a provided at the rear end part of the handle part 12 to be opened and closed when replacing the battery. This spring type contact 14 is electrically connected to the other of the pair of hip side contact terminals of the above described electric lamp 13 by the turning operation in either the left turning direction or the right turning direction of, for example, a dial rotary type power source switch 15 provided at the lid part 12a of the handle part 12 to switch on the electric lamp 13, and on the other hand, by reversely rotating the power source switch 15, the other hip side contact terminal of the electric lamp 13 and the spring type contact 14 are electrically cut to switch off the electric lamp 13.

Furthermore, in the peripheral surface on the tip side of the handle part 12, a male screw part 12b is formed, and a parabola curvature type reflector 16 having a reflecting mirror part formed on the inner surface and a colorless or colored transparent plane glass 17 covering the reflector 16 are attached on the end part opening side of the barrel, and a trumpet-like hood box part 19 whose diameter becomes gradually smaller as going to the rear of the barrel and which has a mounting female screw barrel part 18 having a female screw part 18a on the inside is attached by screwing the above described mounting female screw barrel part 18 into the male screw part 12b of the handle part 12, and through a through hole 16a formed in the center of the reflector 16, the head part of the electric lamp 13 is arranged between the reflector 16 and the plane glass 17. Herein, the hood box part 19 may be in the state where the plane glass 17 is removed to be open and the electric lamp 13 is exposed.

The condenser lens barrel part 20 is formed to have a double cylindrical shape in which a large diameter rear side mounting barrel part 21 and a small diameter front side barrel part 22 are connected through a circular step part 23 approximately at the center, and the rear side mounting barrel part 21 is mounted to the hood box part 19 of the illuminator main body 10, and the tip circumferential fringe part of the hood box part 19 of the illuminator main body 10 is stopped on the inside by the circular step part 23. On the other hand, on the front end part opening side of the front side barrel part 22, a lens keeping frame part 24 is formed in the state where it has a small diameter and projects forward a little to the outer side, and a convex lens 25 is attached thereto.

Figure 2:
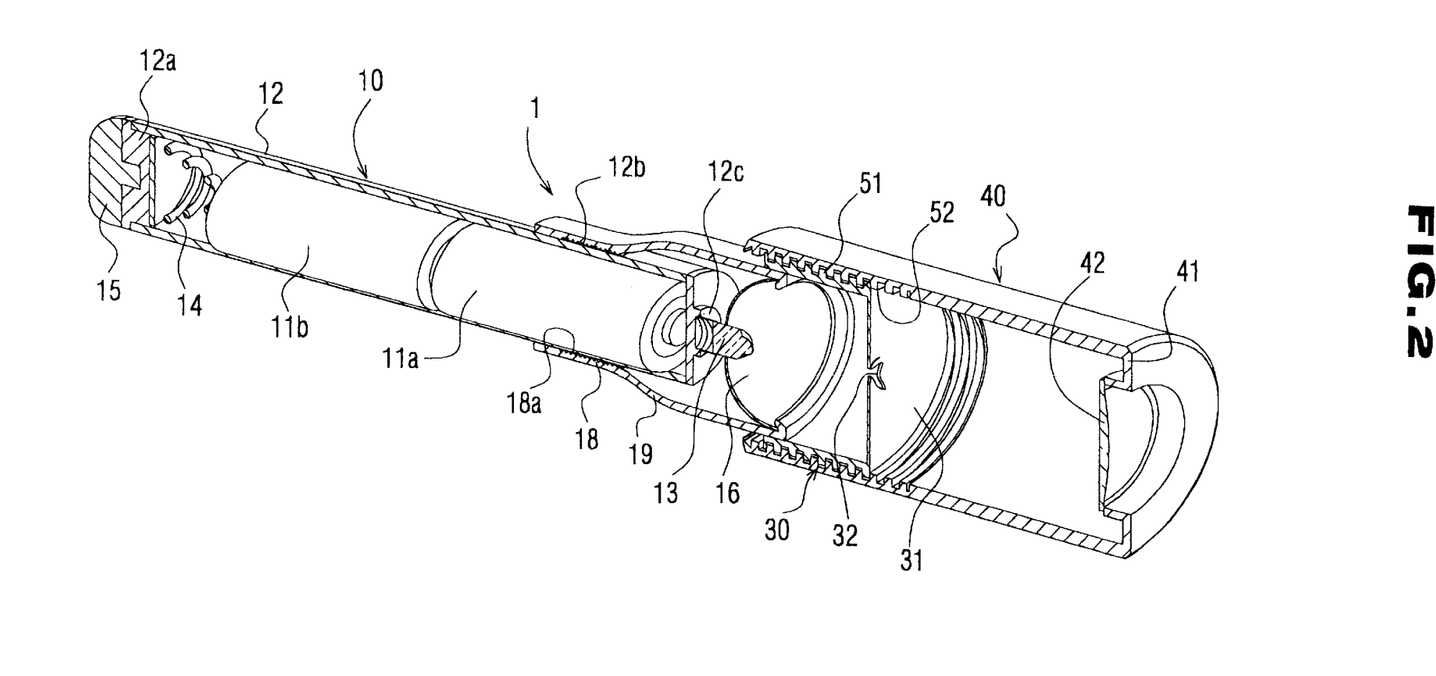
FIG. 2 is a partially cut schematic perspective view according to another embodiment of the present invention.
Figure 3A:
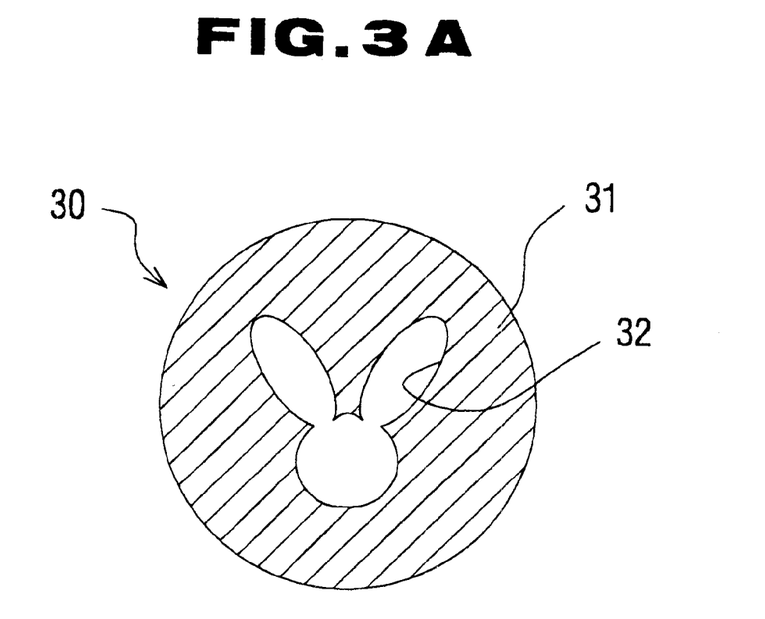
FIG. 3A and FIG. 3B are front cross sectional views of a mask part each showing a shape of a projected silhouette by a projecting opening part according to the present invention.
Figure 3B:
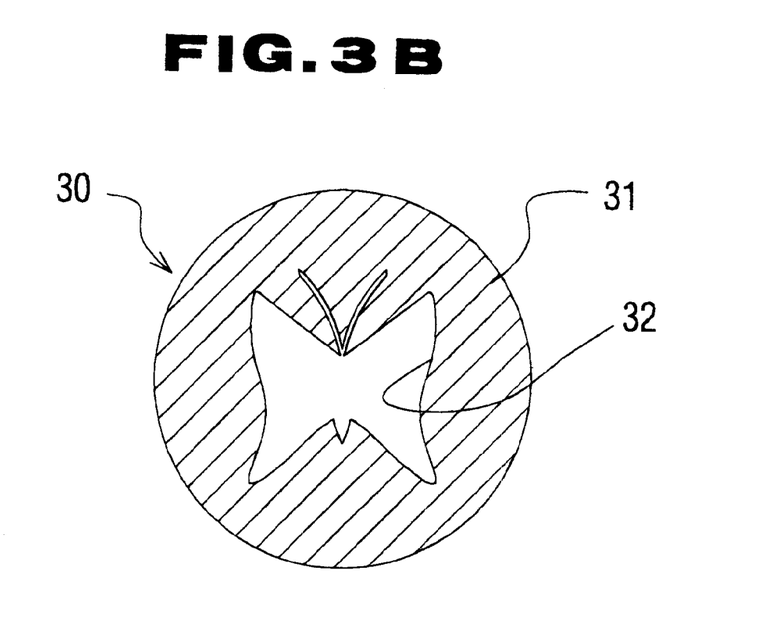

The mask part 30 is attached such that the end part opening side of the barrel is fitted and fixed onto the periphery of the lens keeping frame part 24 of the condenser lens barrel part 20, and at the end part opening side of the barrel of the mask part 30, a shading plate 31 is attached, in which projecting opening parts 32 of various forms are opened and formed at the center, like the form made by cutting along the fringe of a shape of an animal such as a rabbit shown in FIG. 1 and FIG. 3A or a butterfly shown in FIG. 2 and FIG. 3B, an abstract shape, a concrete shape such as a construction, or other shapes. Herein, this shading plate 31 may be formed integrally from the barrel end part opening side of the mask part 30.

In the focus adjusting lens barrel part 40, a lens keeping frame part 41 is formed in the state where it has a smaller diameter on the barrel end part opening side and projects a little to the inside, and a convex lens 42 is attached thereto. Then, the other end part opening side of the focus adjusting lens barrel part 40 is mounted to the front side barrel part 22 of the condenser lens barrel part 20 so that the total of the mask part 30 may be covered, and it can be fitted up to a position where the circumferential fringe end part on the other end part opening side of the other end part of the focus adjusting lens barrel part 40 is stopped on the outside by the circular step part 23 of the condenser lens barrel part 20.

By doing this, the focus adjusting lens barrel part 40 can slide back and forth along the front side barrel part 22 of the condenser lens barrel part 20, and accordingly, by focusing the light of the electric lamp 13 passing through the projecting opening part 32 of the mask part 30 together with the condenser lens barrel part 20, the opening part shape of the projecting opening part 32 is projected in a clear state, and further, it can easily be projected and formed as a clear silhouette at an arbitrary projecting position.

Herein, the focus adjusting lens barrel part 40 may have a screw type structure so that it can move back and forth, for example, with a given screw pitch by being rotated with respect to the front side barrel part 22 of the condenser lens barrel part 20, or it may have a click type structure so that it can move back and forth while being sequentially stopped to the front side barrel part 22 and while being engaged and stopped by clicking.

Next, one example of the assembly and usage according to the embodiment with the above described structure will be described. As shown in FIG. 1, first, the lid part 12a provided at the rear end part of the handle part 12 is opened, and the batteries 11a, 11b are inserted into the handle part 12, and the lid part 12a is screwed and closed and fixed while pressing the batteries 11a, 11b by the spring type contact 14. After attaching the electric lamp 13 in the bayonet socket part 12c at the tip part of the handle part 12, the mounting female screw barrel part 18 of the hood box part 19 is screwed and attached into the male screw part 12b of the handle part 12, and the head part of the electric lamp 13 is arranged between the above described reflector 16 and plane glass 17 through a through hole 16a of the reflector 16.

The rear side mounting barrel part 21 of the condenser lens barrel part 20 is mounted to the tip of the hood box part 19 of the illuminator main body 10, so that the tip circumferential fringe part of the hood box part 19 may be stopped on the inside by the circular step part 23 of the condenser lens barrel part 20. The mask part 30 is fixed to the condenser lens barrel part 20 by fitting the end part opening side of the mask part 30 onto the periphery of the lens keeping frame part 24 of the condenser lens barrel part 20.

The other end part opening side of the focus adjusting lens barrel part 40 is mounted to the front side barrel part 22 of the condenser lens barrel part 20 so that the total of the mask part 30 may be covered. At this moment, in the case where no projection type illuminating device 1 is used, it is fitted up to a position where the circumferential fringe end part on the other end part opening side of the focus adjusting lens barrel part 40 is stopped on the outside by the circular step part 23 of the condenser lens barrel part 20.

Figure 4:
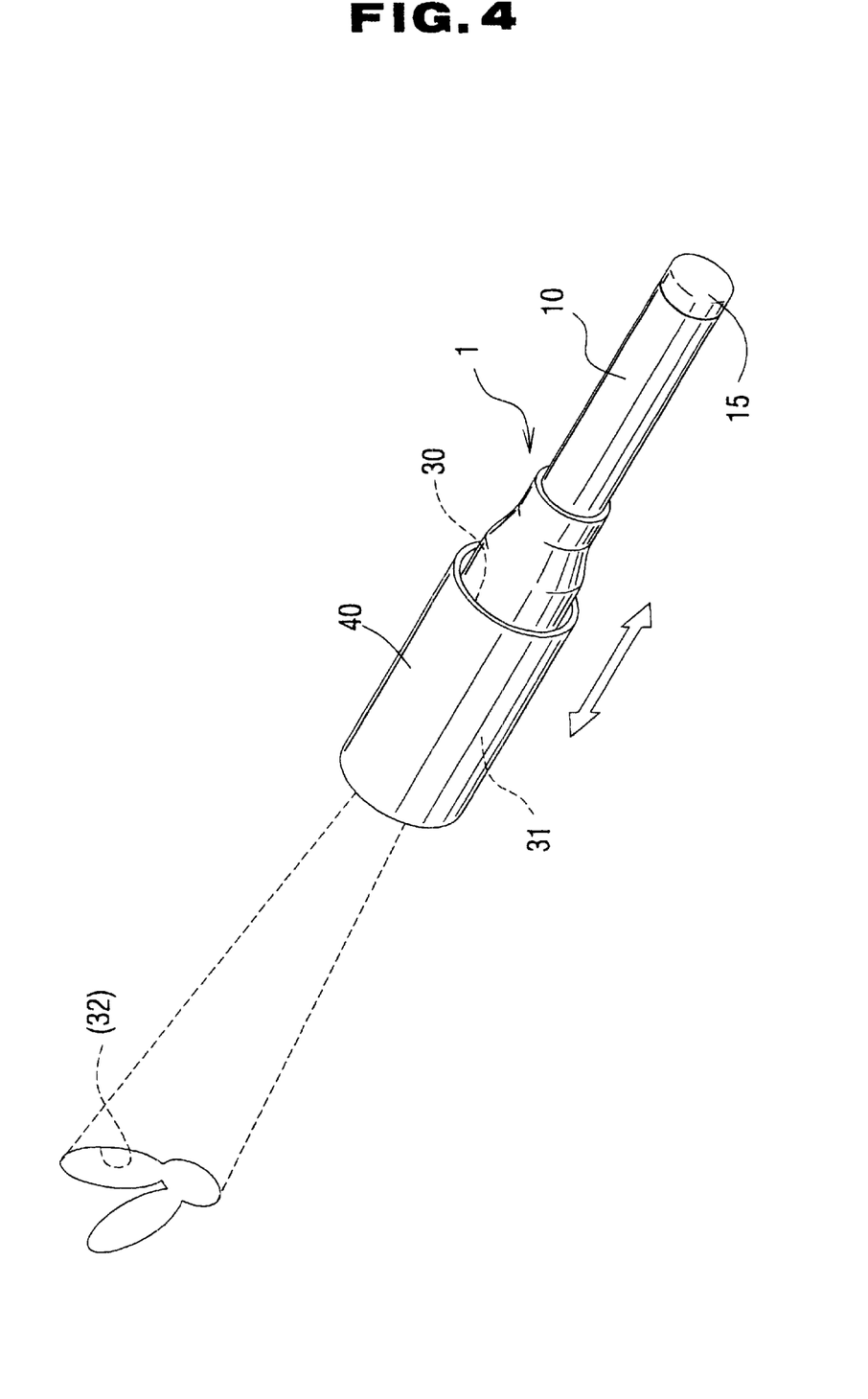
FIG. 4 is a perspective view at the time of projecting use.

Next, when using the projection type illuminating device 1 with such a structure, first, the focus adjusting lens barrel part 40 is pulled out forward from the stopping position on the outside of the circular step part 23, and while sliding that back and forth along the front side barrel part 22 of the condenser lens barrel part 20, the light radiated by the illuminator main body 10 and passing through the projecting opening part 32 of the mask part 30 is focused together with the condenser lens barrel part 20, and consequently, the opening part shape of the projecting opening part 32 is clearly projected on a given object surface or in the air.

Herein, when replacing the battery, the lid part 12a provided at the rear end part of the handle part 12 is opened, and the used batteries 11a, 11b in the handle part 12 are taken out, and new batteries 11a, 11b are inserted, and the lid part 12a should be screwed and closed and fixed while pressing the batteries 11a, 11b by the spring type contact 14.

Herein, in the projection type illuminating device 1 according to the present embodiment, two batteries 11a, 11b such as dry batteries are used, but it is also possible to have a charging type battery structure, or a structure where a power source circuit with a plug for the plug-in connection is provided, as other structures, which is not shown in the figure.

Furthermore, in FIG. 2, another embodiment according to this invention is shown, and to the same components as those in FIG. 1, the same reference numerals are given, and the detailed description thereof is omitted. That is, in this embodiment, the mask part 30 having the shading plate 31 in which the projecting opening parts 32 of various forms such as a form made by cutting along a face of a rabbit are opened and formed at the center is removably attached to the tip of the hood box part 19 of the illuminator main body 10. Then, on the peripheral surface of the mask part 30, a male screw part 51 is formed, and this male screw part 51 is screwed in a female screw part 52 formed in the inner surface on the end part opening side of the focus adjusting lens barrel part 40, and the above described focus adjusting lens barrel part 40 is attached so that the total of the mask part 30 may be covered. On the tip opening side of this focus adjusting lens barrel part 40, the lens keeping frame part 41 is formed in a state where it has a small diameter and projects a little to the inside, and the convex lens 42 is attached thereto.

By doing this, the focus adjusting lens barrel part 40 can slide back and forth with a given screw pitch along the above described mask part 30 by being rotated with respect to the mask part 30, and accordingly, by imaging the opening part shape of the projecting opening part 32 projected by the light of the electric lamp 13 passing through the projecting opening part 32 of the mask part 30 on an arbitrary projecting position, the above described opening part shape can be projected in a clear state.

Figure 5:
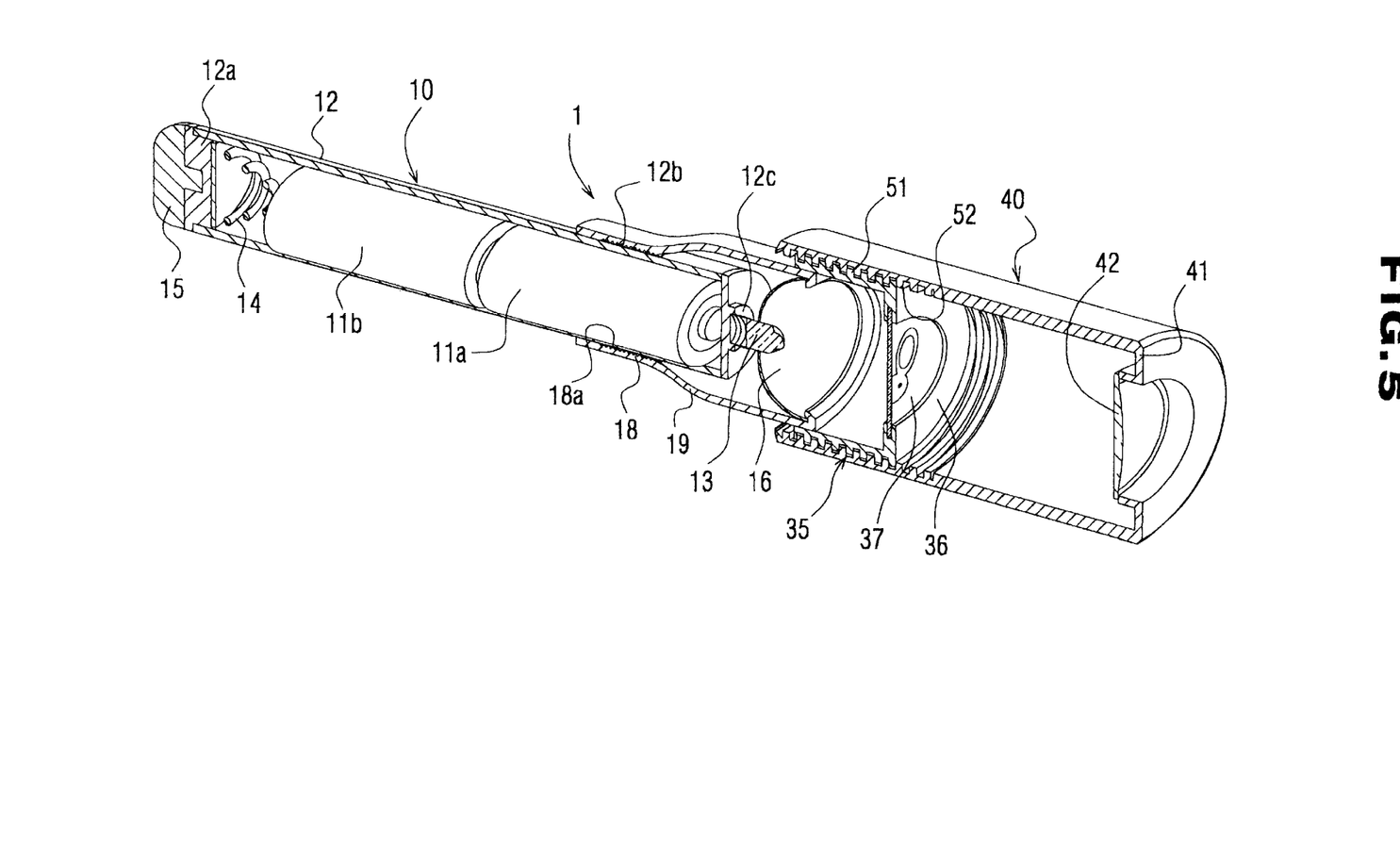
FIG. 5 is a partially cut schematic perspective view according to still another embodiment of the present invention.
Figure 6:
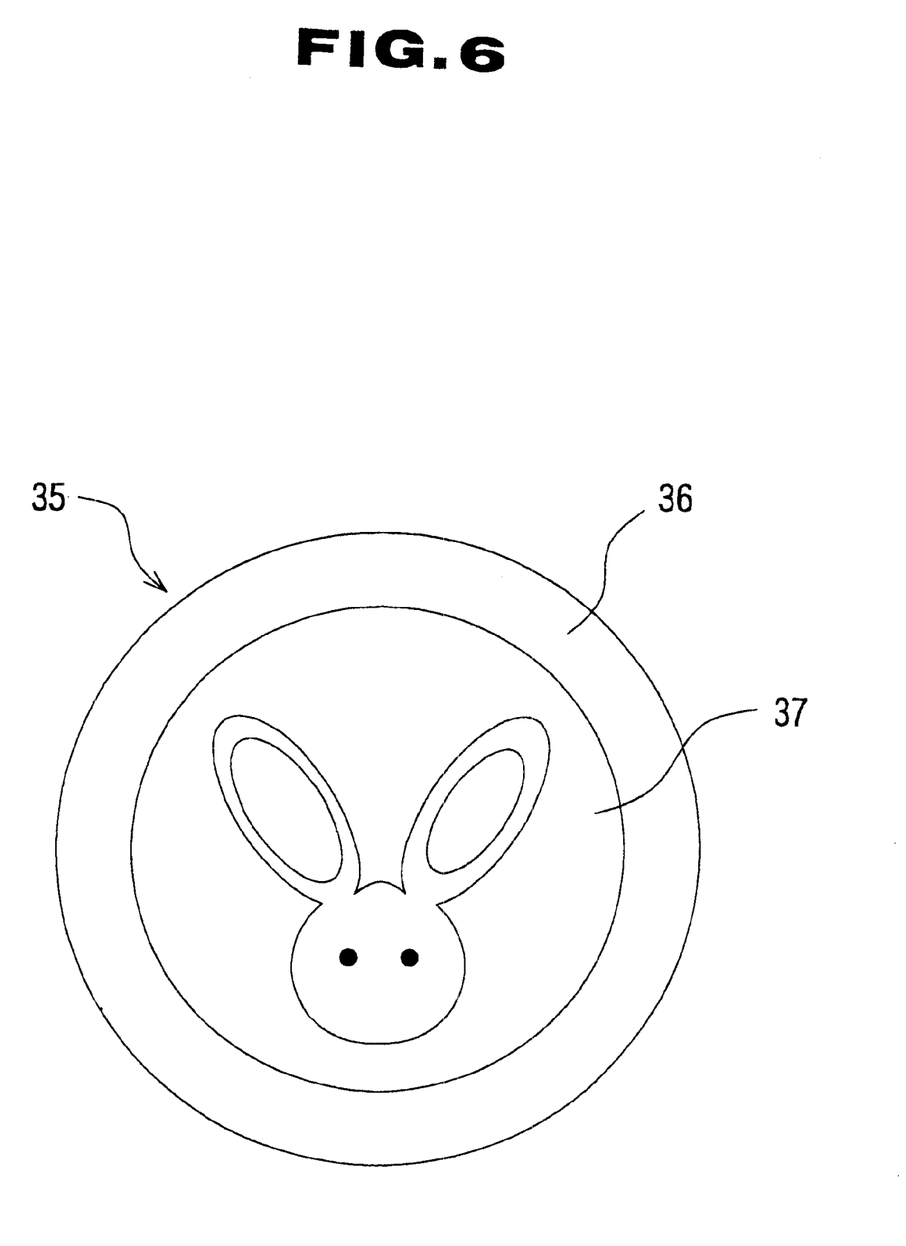
FIG. 6 is a front view showing one example of a pattern on the projecting plate of the mask part according to the embodiment shown in FIG. 5.
Figure 7:
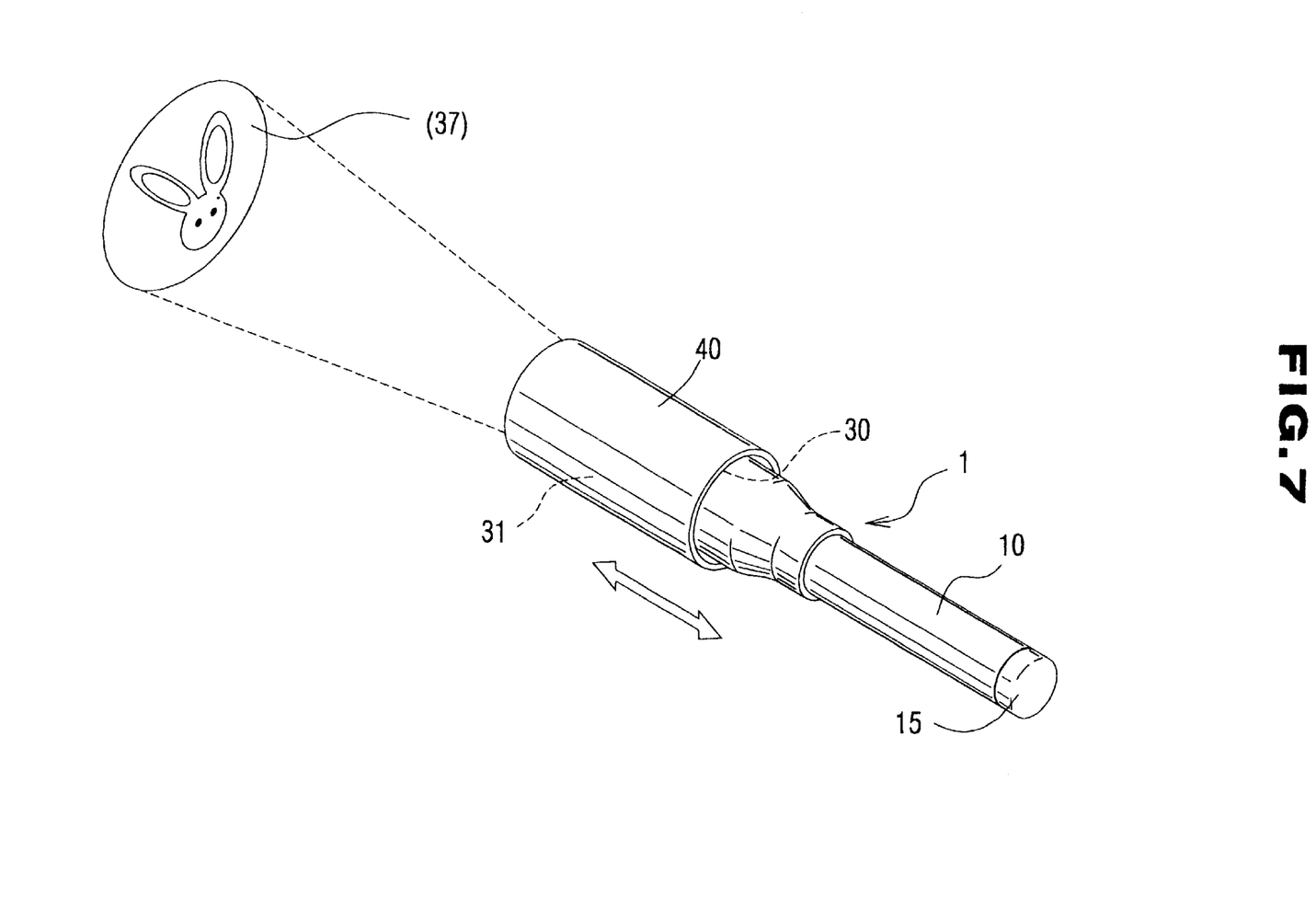
FIG. 7 is a perspective view at the time of projecting use.

Furthermore, in FIG. 5 to FIG. 7, still another embodiment according to this invention is shown, and to the same components as those in FIG. 1, the same reference numerals are given, and the detailed description thereof is omitted. That is, in this embodiment, the mask part 35 having the shading plate 36 with the projecting plates 37 where a character, a symbol, a mark, a diagram, a pattern or the like, or various figures having a color thereto such as a pattern made by drawing eyes, a nose or the like in the outer line of a face of a rabbit are displayed, are removably attached to the tip of the hood box part 19 of the illuminator main body 10. Then, on the peripheral surface of the mask part 35, the male screw part 51 is formed, and this male screw part 51 is screwed in the female screw part 52 formed in the inner surface on the end part opening side of the focus adjusting lens barrel part 40, and the above described focus adjusting lens barrel part 40 is attached so that the total of the mask part 30 may be covered. On the tip opening side of this focus adjusting lens barrel part 40, the lens keeping frame part 41 is formed in the state where it has a small diameter and projects a little to the inside, and the convex lens 42 is attached thereto.

Herein, the projecting plate 37 is formed by a translucent material, and it is a transparent film, a glass plate, a transparent synthetic resin plate or the like, and the figure displayed on this projecting plate 37 can be displayed and formed as a figure where not only the contours of various figures but also dots and drawing lines independent from the contours are simultaneously realized, and the variety of expression can be attained, when compared with the case of the projecting opening part 32 according to the above described embodiment where the silhouette is displayed only by the contour of the light flux of the opening part shape thereof. Furthermore, by painting out the peripheral part in this projecting plate 37 in, for example, black or the like, it can be expressed like a silhouette by the light flux of the part that is not painted out.

By doing this, a given figure displayed on the projecting plate 37 is projected by the light passing through the projecting plate 37 of the mask part 35, and complex various characters and patterns or the like can be expressed and projected, and the projected figure can be more interesting, when compared with the case where the monochromatic light and shade of the light flux along the contour of the opening part shape is realized like the above described embodiment. Furthermore, by rotating the focus adjusting lens barrel part 40 with respect to the mask part 35, it can be slid back and forth with a given screw pitch along the above described mask part 35, and accordingly, by imaging the various figure displays projected by the light of the electric lamp 13 passing through the projecting plate 37 of the mask part 35 on an arbitrary projecting position, they can be projected in a clear state.

Herein, in the mask parts 30, 35 according to any embodiment, the shape of the projecting opening part 32 thereof and the figure on the projecting plate 37 or the like can arbitrarily be formed, and therefore, it is preferable to variously form and prepare a plurality of kinds of different parts in advance, and by freely replacing the mask parts 30, 35 in a state of being removable from the illuminator main body 10, it is possible to enjoy various projected silhouettes and figures or the like.

Since this invention is configured as mentioned above, a clear figure such as a silhouette, a character, or a pattern can easily be projected and formed on the projecting position by lighting the electric lamp 13, and further, even when the light carelessly enters an eye of a person, the eye is not damaged and safe use is possible, and furthermore, it can be a portable device that can widely be used as a projecting apparatus such as a projecting toy, besides an illuminating apparatus such as a flashlight or an advertising illumination, since it has a simple structure and can be provided at a low cost.

That is, the reason is that this invention is a projection type illuminating device 1 which comprises an illuminator main body 10 for performing radiation by the light source 13 and mask parts 30, 35 removably attached to the tip of the illuminator main body 10, in which the opening part shape of the projecting opening part 32 is projected as it is illuminated from the back with the light radiated by the illuminator main body 10 and passing through the projecting opening part 32 of the mask part 30, or the various figures are projected as they are by the light passing through the projecting plate 37 of the mask part 35, and it is possible to project and form a clear silhouette by the light flux of the opening part shape of the projecting opening part 32, or complex figures on the projecting plate 37 such as various patterns.

Furthermore, these silhouettes and complex figures or the like can be realized by a simple structure where the mask parts 30, 35 having the projecting opening part 32 and the projecting plate 37 are removably attached to the tip the illuminator main body 10, and therefore, it is unnecessary to provide a complex and expensive liquid crystal display body which exists in a flashlight according to, for example, previously proposed Japanese Patent Laid-Open No. 2-192601, and further, it can easily be enjoyed as an interesting device by replacing the mask parts 30, 35 having different opening part shapes and patterns or the like.

Furthermore, the opening part shape of the projecting opening part 32 and the figure on the projecting plate 37 or the like are projected as they are by the focus adjusting lens barrel part 40 using the light passing through the mask parts 30, 35, and therefore, those opening shape and figure or the like can be projected in a focused state, and further, the focusing performance can be more improved by working together with the condenser lens barrel part 20 removably attached to the illuminator main body 10, and clear silhouettes and figure displays can be made.

The focus adjusting lens barrel part 40 may have a screw type structure so that it may move back and forth by being screw-rotated with respect to the mask parts 30, 35, or it may have a click type structure so that it may move back and forth while sequentially being stopped to the mask parts 30, 35, and therefore, in the case of the focus adjusting lens barrel part 40 with a screw type structure, the focus adjusting lens barrel part 40 can smoothly move back and forth, for example, with a given screw pitch by being screw-rotated, and further, the positioning of the focus adjusting lens barrel part 40 can accurately be performed. Furthermore, in the case of the focus adjusting lens barrel part 40 with a click type structure, the focus adjusting lens barrel part 40 can accurately be moved back and forth while sequentially being stopped to the front side lens barrel part 22, and further, the positioning and keeping of the focus adjusting lens barrel part 40 to the condenser lens barrel part 20 can easily be performed.

What is claimed is:

1. A projection type illuminating device comprising:
    an illuminator main body for performing radiation by a light source;
    a condenser lens barrel part removably attached to a tip of said illuminator main body, said condenser tens barrel part having a condenser lens;
    a mask part disposed in front of said condenser lens barrel part and removably attached to a tip of said condenser lens barrel part and including a shading plate having therein at least one partially transparent part; and
    a focus adjusting lens barrel part, said mask part having a first cooperating part and said focus adjusting barrel pan having a second cooperating part such that said focus adjusting lens barrel part is movably attached to said mask part in a state of covering said mask part such that said focus adjusting lens barrel part is contractible toward and expandable from said illumination main body over said mask part, said focus adjusting lens barrel part having a focus adjusting lens;
    wherein a shape of the at least one partially transparent part of the shading plate is projected by focusing light from said illuminator main body backwardly radiated on and passing through said condenser lens and the shading plate of said mask part by using said focus adjusting lens barrel part.

2. A projection type illuminating device as claimed in claim 1, wherein the at least one transparent part comprises a projecting opening part formed on the shading plate, whereby an opening shape of the projecting opening part is projected by focusing light radiated by said illuminator main body and passing through the projecting opening part of the mask part by using the focus adjusting lens barrel part.

3. A projection type illuminating device as claimed in claim 1, wherein the at least one partially transparent part comprises a translucent projecting plate having thereon a figure inclusive of a symbol, pattern and other displayed figure, whereby a figure shape on the translucent projecting plate is projected by light radiated by the illuminator main body and passing through the projecting plate of the mask part.

4. A projection type illuminating device as claimed in claim 1, wherein said focus adjusting lens barrel part has a screw type structure so that said focus adjusting lens barrel part can move back and forth by being screw-rotated with respect to said mask part.

5. A projection type illuminating device comprising:

an illuminator main body for performing radiation by alight source;

a mask part removably attached to a tip of said illuminator main body and including a shading plate having therein at least one partially transparent part; and a focus adjusting lens barrel part, said mask part having a first cooperating part and said focus adjusting barrel part having a second cooperating part such that said focus adjusting lens barrel part is movably attached to said mask part in a state of covering said mask part such that said focus adjusting lens barrel part is contractible toward and expandable from said illumination main body over said mask part, said focus adjusting lens barrel part having a focus adjusting lens;

wherein a shape of the at least one partially transparent part of the shading plate is projected by focusing light from said illuminator main body backwardly radiated on and passing through the shading plate of said mask part by using said focus adjusting lens barrel part.

6. A projection type illuminating device as claimed in claim 5, wherein the at least one transparent part comprises a projecting opening part formed on the shading plate, whereby an opening shape of the projecting opening part is projected by focusing light radiated by said illuminator main body and passing through the projecting opening part of the mask part by using the focus adjusting lens barrel part.

7. A projection type illuminating, device as claimed in claim 5, wherein the at least one partially transparent part comprises a translucent projecting plate having thereon a figure inclusive of a symbol, pattern and other displayed figure, whereby a figure shape on the translucent projecting plate is projected by light radiated by the illuminator main body and passing through the projecting plate of the mask part.

8. A projection type illuminating device as claimed in claim 5, wherein said focus adjusting lens barrel part has a screw type structure so that said focus adjusting lens barrel part can move hack and forth by being screw-rotated with respect to said mask part.

\* \* \* \* \*